(12) United States Patent
Pathak et al.

(10) Patent No.: US 11,709,805 B2
(45) Date of Patent: Jul. 25, 2023

(54) SYSTEM AND METHOD FOR PAAS CLOUD READY RANDOM ACCESS REPORT GENERATION

(71) Applicant: JPMorgan Chase Bank, N.A., New York, NY (US)

(72) Inventors: Ambika Pathak, Mumbai (IN); Sandip Patil, Mumbai (IN); Piyush Khandelwal, Bangalore (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/648,483

(22) Filed: Jan. 20, 2022

(65) Prior Publication Data
US 2023/0177022 A1 Jun. 8, 2023

(30) Foreign Application Priority Data
Dec. 7, 2021 (IN) .............................. 202111056794

(51) Int. Cl.
*G06F 16/188* (2019.01)
(52) U.S. Cl.
CPC ................................. *G06F 16/188* (2019.01)
(58) Field of Classification Search
CPC .................................................... G06F 16/188
See application file for complete search history.

(56) References Cited

U.S. PATENT DOCUMENTS

| 10,915,270 B2 * | 2/2021 | Balko .................. G06F 3/0673 |
| 2007/0086260 A1 * | 4/2007 | Sinclair ............... G06F 12/0246 |
| | | 711/E12.008 |

* cited by examiner

*Primary Examiner* — Cam Y T Truong
(74) *Attorney, Agent, or Firm* — Greenblum & Bernstein, P.L.C.

(57) ABSTRACT

Various methods, apparatuses/systems, and media for PaaS cloud ready random access report generation are disclosed. A processor receives an initial intermediate file having intermediate contents to be utilized for PaaS cloud ready random access report generation; determines whether the intermediate contents exceed a predetermined memory threshold value; implements a first mode of report generation algorithm to create a final intermediate file when it is determined that a memory requirement for the intermediate contents is equal to or below the predetermined memory threshold value or implement a second mode of report generation algorithm to create the final intermediate file when it determined that the memory requirement for the intermediate contents exceed the predetermined memory threshold value; transmits the final intermediate file to a rendering engine; and generates a report based on the final intermediate file.

9 Claims, 8 Drawing Sheets

400

SYSTEM AND METHOD FOR PAAS CLOUD READY RANDOM ACCESS REPORT GENERATION

CROSS-REFERENCE TO RELATED APPLICATIONS

This application claims the benefit of priority from Indian Provisional Patent Application No. 202111056794, filed Dec. 7, 2021, which is herein incorporated by reference in its entirety.

TECHNICAL FIELD

This disclosure generally relates to data processing, and, more particularly, to methods and apparatuses for implementing a random access report generation module that is configured for cloud ready random access report generation so that streams of data can be accessed in random fashion and can be deployed in PaaS (Platform as a Service) containers.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Conventional report generation tool such as the Business Intelligence and Reporting Tool (BIRT) is an open source software project that may provide reporting and business intelligence capabilities for rich client and web applications, especially those based on Java and Java Enterprise Edition (Java EE). However, BIRT does not have any cloud ready version for its open source variant.

For example, BIRT depends heavily on local file writing which is not possible to do in PaaS cloud containers. While deployed in cloud containers, applications have to make use of storage services like Amazon-S3. Today, there are different types of files that may be read or written by BIRT, i.e., Report Design File; Intermediate File (called as "rptdocument") created for its "Rendering Engine" to render in any format xls, csv, pdf etc.; Temporary Content file—when contents are larger, BIRT may write them to disk (named 'goal file') while rendering; and Final output file (pdf, xls or csv). Out of these different types of files, 'Intermediate' and 'Temporary Content' files may be written in "Random Access" manner where in a structure of file may be initially created and then multiple write operations may be performed by seeking back-and-forth to different sections of file (made possible by native C++ code invoked through java RandomAccessFile class). However, RandomAccessFile class may work well in a non-cloud mode as these files are locally stored. In PaaS cloud, one cannot rely on local storage concept completely. Thus, the conventional report generation tools lack the configurations and capabilities for PaaS cloud ready random access report generation.

Thus, there is a need for an advanced report generation tool that can address these conventional shortcomings.

SUMMARY

The present disclosure, through one or more of its various aspects, embodiments, and/or specific features or sub-components, provides, among other features, various systems, servers, devices, methods, media, programs, and platforms for implementing a random access report generation module that is configured for cloud ready random access report generation so that streams of data can be accessed in random fashion and can be deployed in PaaS containers, but the disclosure is not limited thereto.

According to an aspect of the present disclosure, a method for cloud ready random access report generation by utilizing one or more processors along with allocated memory is disclosed. The method may include: receiving an initial intermediate file having intermediate contents to be utilized for cloud ready random access report generation; determining whether the intermediate contents exceed a predetermined memory threshold value; implementing a first mode of report generation algorithm to create a final intermediate file when it is determined that a memory requirement for the intermediate contents is equal to or below the predetermined memory threshold value or implementing a second mode of report generation algorithm to create the final intermediate file when it determined that the memory requirement for the intermediate contents exceed the predetermined memory threshold value; transmitting the final intermediate file to a rendering engine; and generating a report based on the final intermediate file.

According to yet another aspect of the instant disclosure, in implementing the first mode of report generation algorithm, the method may further include: determining that the memory requirement for the intermediate contents is equal to or below the predetermined memory threshold value; executing, based on determining, random access writing in a local file system's in-memory byte array by shifting positions as it happens in random file access over file stream; and creating the final intermediate file.

According to a further aspect of the instant disclosure, in implementing the second mode of report generation algorithm, the method may further include: determining that the memory requirement for the intermediate contents exceeds the predetermined memory threshold value; and executing, based on determining, random access writing in a cloud file system, i.e., a PaaS cloud object storage, but the disclosure in not limited thereto.

According to an additional aspect of the instant disclosure, the method may further include: creating multiple sections of the initial intermediate file in separate individual objects in the cloud file system; performing operations on the individual objects with readers or writers in a report generation framework; and merging all individual objects to create the final intermediate file.

According to yet another aspect of the instant disclosure, the method may further include: implementing an object merger function that keeps track of the multiple sections of the initial intermediate file and their sequences and joins them to create the final intermediate file based on offset and sequence.

According to yet another aspect of the instant disclosure, the method may further include: implementing a stream access wrapper function to execute writing of the multiple sections of the initial intermediate file into the separate individual multiple objects; and identifying location of each object in the cloud file system for writing binary content.

According to another aspect of the instant disclosure, the method may further include: splitting the binary content into multiple similar objects when it is determined that memory requirements for the multiple similar objects exceed the predetermined memory threshold value.

According to an aspect of the present disclosure, a system for cloud ready random access report generation is disclosed. The system may include: a processor; and a memory operatively connected to the processor via a communication interface, the memory storing computer readable instructions, when executed, may cause the processor to: receive an initial intermediate file having intermediate contents to be utilized for cloud ready random access report generation; determine whether the intermediate contents exceed a predetermined memory threshold value; implement a first mode of report generation algorithm to create a final intermediate file when it is determined that a memory requirement for the intermediate contents is equal to or below the predetermined memory threshold value or implement a second mode of report generation algorithm to create the final intermediate file when it determined that the memory requirement for the intermediate contents exceed the predetermined memory threshold value; transmit the final intermediate file to a rendering engine; and generate a report based on the final intermediate file.

According to yet another aspect of the instant disclosure, in implementing the first mode of report generation algorithm, the processor may be further configured to: determine that the memory requirement for the intermediate contents is equal to or below the predetermined memory threshold value; execute, based on determining, random access writing in a local file system's in-memory byte array by shifting positions as it happens in random file access over file stream; and create the final intermediate file.

According to a further aspect of the instant disclosure, in implementing the second mode of report generation algorithm, the processor may be further configured to: determine that the memory requirement for the intermediate contents exceeds the predetermined memory threshold value; and execute, based on determining, random access writing in a cloud file system.

According to an additional aspect of the instant disclosure, the processor may be further configured to: create multiple sections of the initial intermediate file in separate individual objects in the cloud file system; perform operations on the individual objects with readers or writers in a report generation framework; and merge all individual objects to create the final intermediate file.

According to yet another aspect of the instant disclosure, the processor may be further configured to: implement an object merger function that keeps track of the multiple sections of the initial intermediate file and their sequences and joins them to create the final intermediate file based on offset and sequence.

According to yet another aspect of the instant disclosure, the processor may be further configured to: implement a stream access wrapper function to execute writing of the multiple sections of the initial intermediate file into the separate individual multiple objects; and identify location of each object in the cloud file system for writing binary content.

According to another aspect of the instant disclosure, the processor may be further configured to: split the binary content into multiple similar objects when it is determined that memory requirements for the multiple similar objects exceed the predetermined memory threshold value.

According to an aspect of the present disclosure, a non-transitory computer readable medium configured to store instructions for cloud ready random access report generation is disclosed. The instructions, when executed, may cause a processor to perform the following: receiving an initial intermediate file having intermediate contents to be utilized for cloud ready random access report generation; determining whether the intermediate contents exceed a predetermined memory threshold value; implementing a first mode of report generation algorithm to create a final intermediate file when it is determined that a memory requirement for the intermediate contents is equal to or below the predetermined memory threshold value or implementing a second mode of report generation algorithm to create the final intermediate file when it determined that the memory requirement for the intermediate contents exceed the predetermined memory threshold value; transmitting the final intermediate file to a rendering engine; and generating a report based on the final intermediate file.

According to yet another aspect of the instant disclosure, in implementing the first mode of report generation algorithm, the instructions, when executed, may cause the processor to further perform the following: determining that the memory requirement for the intermediate contents is equal to or below the predetermined memory threshold value; executing, based on determining, random access writing in a local file system's in-memory byte array by shifting positions as it happens in random file access over file stream; and creating the final intermediate file.

According to a further aspect of the instant disclosure, in implementing the second mode of report generation algorithm, the instructions, when executed, may cause the processor to further perform the following: determining that the memory requirement for the intermediate contents exceeds the predetermined memory threshold value; and executing, based on determining, random access writing in a cloud file system.

According to an additional aspect of the instant disclosure, the instructions, when executed, may cause the processor to further perform the following: creating multiple sections of the initial intermediate file in separate individual objects in the cloud file system; performing operations on the individual objects with readers or writers in a report generation framework; and merging all individual objects to create the final intermediate file.

According to yet another aspect of the instant disclosure, the instructions, when executed, may cause the processor to further perform the following: implementing an object merger function that keeps track of the multiple sections of the initial intermediate file and their sequences and joins them to create the final intermediate file based on offset and sequence.

According to yet another aspect of the instant disclosure, the instructions, when executed, may cause the processor to further perform the following: implementing a stream access wrapper function to execute writing of the multiple sections of the initial intermediate file into the separate individual multiple objects; and identifying location of each object in the cloud file system for writing binary content.

According to another aspect of the instant disclosure, the instructions, when executed, may cause the processor to further perform the following: splitting the binary content into multiple similar objects when it is determined that memory requirements for the multiple similar objects exceed the predetermined memory threshold value.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
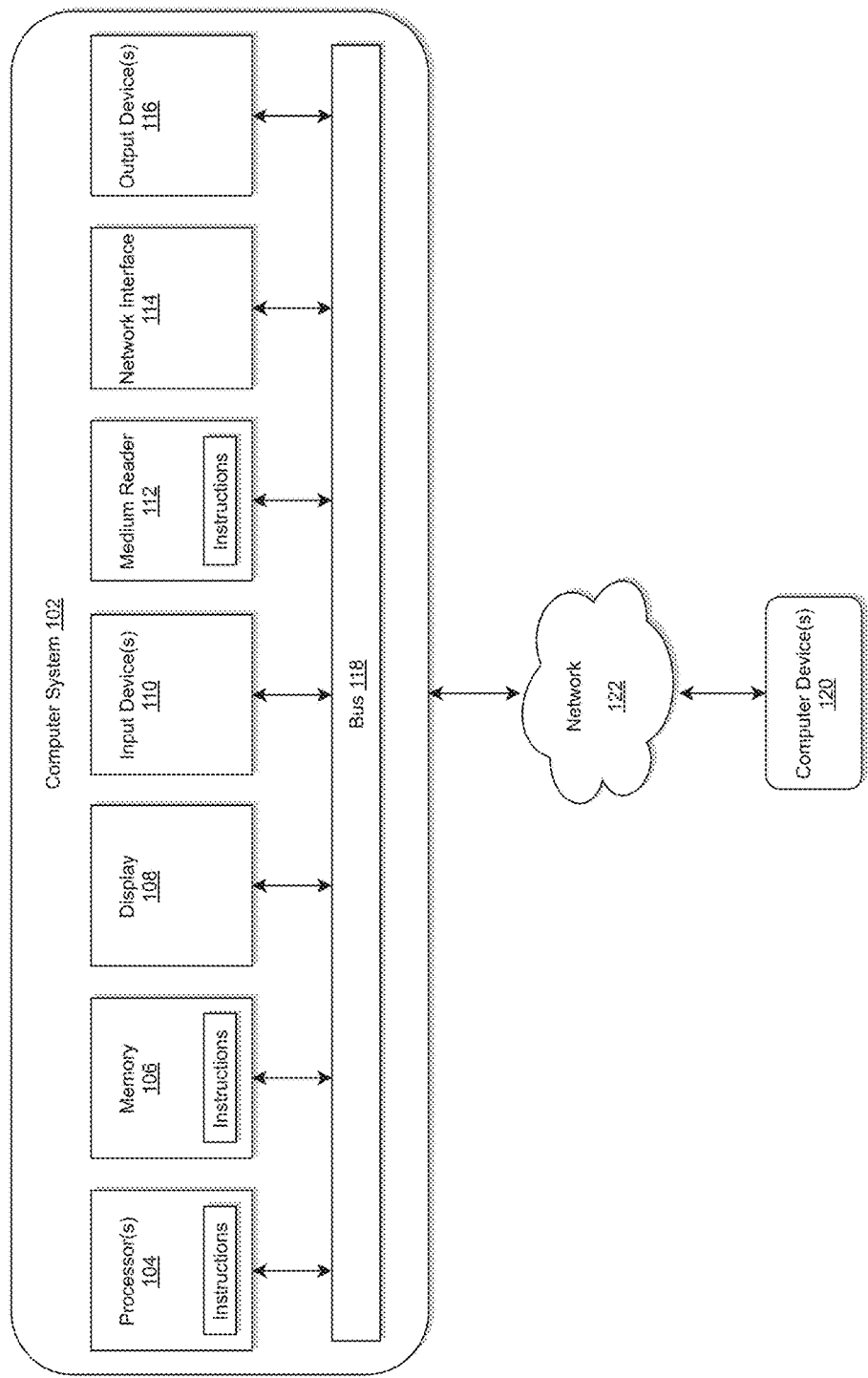
FIG. 1 illustrates a computer system for implementing a random access report generation module that is configured for cloud ready random access report generation in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a random access report generation module that is configured for cloud ready random access report generation in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

The data recording files, according to exemplary embodiments, may be written using JSON, but the disclosure is not limited thereto. For example, the data recording files can easily be extended to other readable file formats such as XML, YAML, binary etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
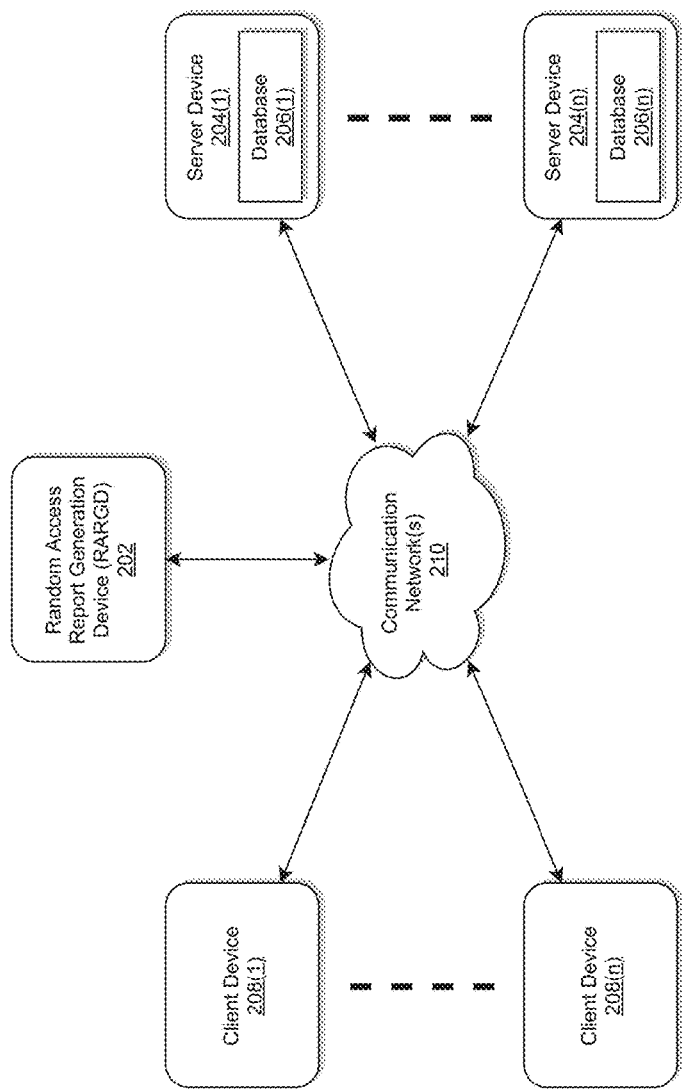
FIG. 2 illustrates an exemplary diagram of a network environment with a random access report generation device in accordance with an exemplary embodiment.

Referring to FIG. 2, a schematic of an exemplary network environment 200 for implementing a platform and language agnostic random access report generation device (RARGD) of the instant disclosure is illustrated.

According to exemplary embodiments, the above-described problems associated with conventional approach of data processing may be overcome by implementing a RARGD 202 as illustrated in FIG. 2 that may be configured for cloud ready random access report generation so that streams of data can be accessed in random fashion and can be deployed in PaaS containers, but the disclosure is not limited thereto.

The RARGD 202 may be the same or similar to the computer system 102 as described with respect to FIG. 1.

The RARGD 202 may store one or more applications that can include executable instructions that, when executed by the RARGD 202, cause the RARGD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the RARGD 202 itself, may be located in virtual server(s) running in a cloud-based computing environment rather than being tied to one or more specific physical network computing devices. Also, the application(s) may be running in one or more virtual machines (VMs) executing on the RARGD 202. Additionally, in one or more embodiments of this technology, virtual machine(s) running on the RARGD 202 may be managed or supervised by a hypervisor.

In the network environment 200 of FIG. 2, the RARGD 202 is coupled to a plurality of server devices 204(1)-204(n) that hosts a plurality of databases 206(1)-206(n), and also to a plurality of client devices 208(1)-208(n) via communication network(s) 210. A communication interface of the RARGD 202, such as the network interface 114 of the computer system 102 of FIG. 1, operatively couples and communicates between the RARGD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the RARGD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The RARGD 202 may be a standalone device or integrated with one or more other devices or apparatuses, such as one or more of the server devices 204(1)-204(n), for example. In one particular example, the RARGD 202 may be hosted by one of the server devices 204(1)-204(n), and other arrangements are also possible. Moreover, one or more of the devices of the RARGD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the RARGD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the RARGD 202 that may efficiently provide a platform for implementing a random access report generation module that is configured for cloud ready random access report generation so that streams of data can be accessed in random fashion and can be deployed in PaaS containers, but the disclosure is not limited thereto.

The client devices 208(1)-208(n) may run interface applications, such as standard web browsers or standalone client applications, which may provide an interface to communicate with the RARGD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the RARGD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the RARGD 202, the server devices 204(1)-204(n), or the client devices 208(1)-208(n), for example, may be configured to operate as virtual instances on the same physical machine. For example, one or more of the RARGD 202, the server devices 204(1)-204(n), or the client devices 208(1)-208(n) may operate on the same physical device rather than as separate devices communicating through communication network(s) 210. Additionally, there may be more or fewer RARGDs 202, server devices 204(1)-204(n), or client devices 208(1)-208(n) than illustrated in FIG. 2. According to exemplary embodiments, the RARGD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
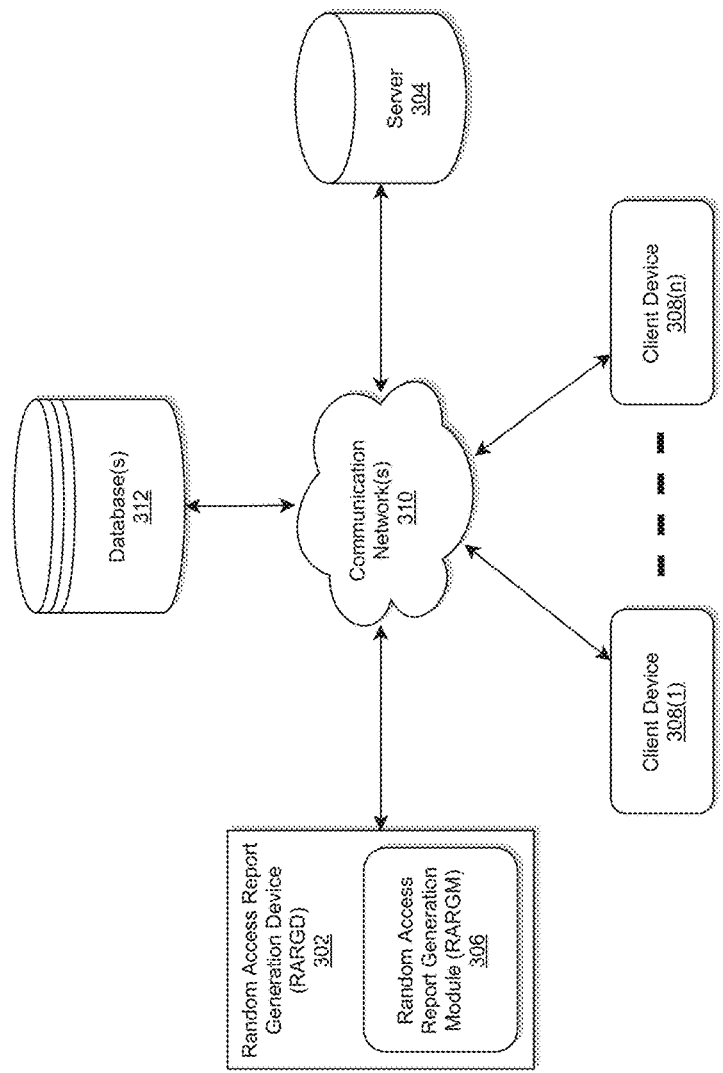
FIG. 3 illustrates a system diagram for implementing a random access report generation device having a random access report generation module in accordance with an exemplary embodiment.

FIG. 3 illustrates a system diagram for implementing a platform and language agnostic random access report generation device (RARGD) having a platform and language agnostic random access report generation module (RARGM) in accordance with an exemplary embodiment.

As illustrated in FIG. 3, the system 300 may include a RARGD 302 within which a RARGM 306 is embedded, a server 304, a database(s) 312, a plurality of client devices 308(1) . . . 308(n), and a communication network 310.

According to exemplary embodiments, the RARGD 302 including the RARGM 306 may be connected to the server 304, and the database(s) 312 via the communication network 310. The RARGD 302 may also be connected to the plurality of client devices 308(1) . . . 308(n) via the communication network 310, but the disclosure is not limited thereto.

According to exemplary embodiment, the RARGD 302 is described and shown in FIG. 3 as including the RARGM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) may be a mainframe database, a log database that may that may produce programming for searching, monitoring, and analyzing machine-generated data via a web interface, etc., but the disclosure is not limited thereto.

According to exemplary embodiments, the RARGM 306 may be configured to receive real-time feed of data from the plurality of client devices 308(1) . . . 308(n) via the communication network 310.

As will be described below, the RARGM 306 may be configured to: receive an initial intermediate file having intermediate contents to be utilized for cloud ready random access report generation; determine whether the intermediate contents exceed a predetermined memory threshold value; implement a first mode of report generation algorithm to create a final intermediate file when it is determined that a memory requirement for the intermediate contents is equal to or below the predetermined memory threshold value or implement a second mode of report generation algorithm to create the final intermediate file when it determined that the memory requirement for the intermediate contents exceed the predetermined memory threshold value; transmit the final intermediate file to a rendering engine; and generate a report based on the final intermediate file, but the disclosure is not limited thereto.

The plurality of client devices 308(1) . . . 308(n) are illustrated as being in communication with the RARGD 302. In this regard, the plurality of client devices 308(1) . . . 308(n) may be "clients" of the RARGD 302 and are described herein as such. Nevertheless, it is to be known and understood that the plurality of client devices 308(1) . . . 308(n) need not necessarily be "clients" of the RARGD 302, or any entity described in association therewith herein. Any additional or alternative relationship may exist between either or both of the plurality of client devices 308(1) . . . 308(n) and the RARGD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the RARGD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The RARGD 302 may be the same or similar to the RARGD 202 as described with respect to FIG. 2, including any features or combination of features described with respect thereto.

Figure 4:
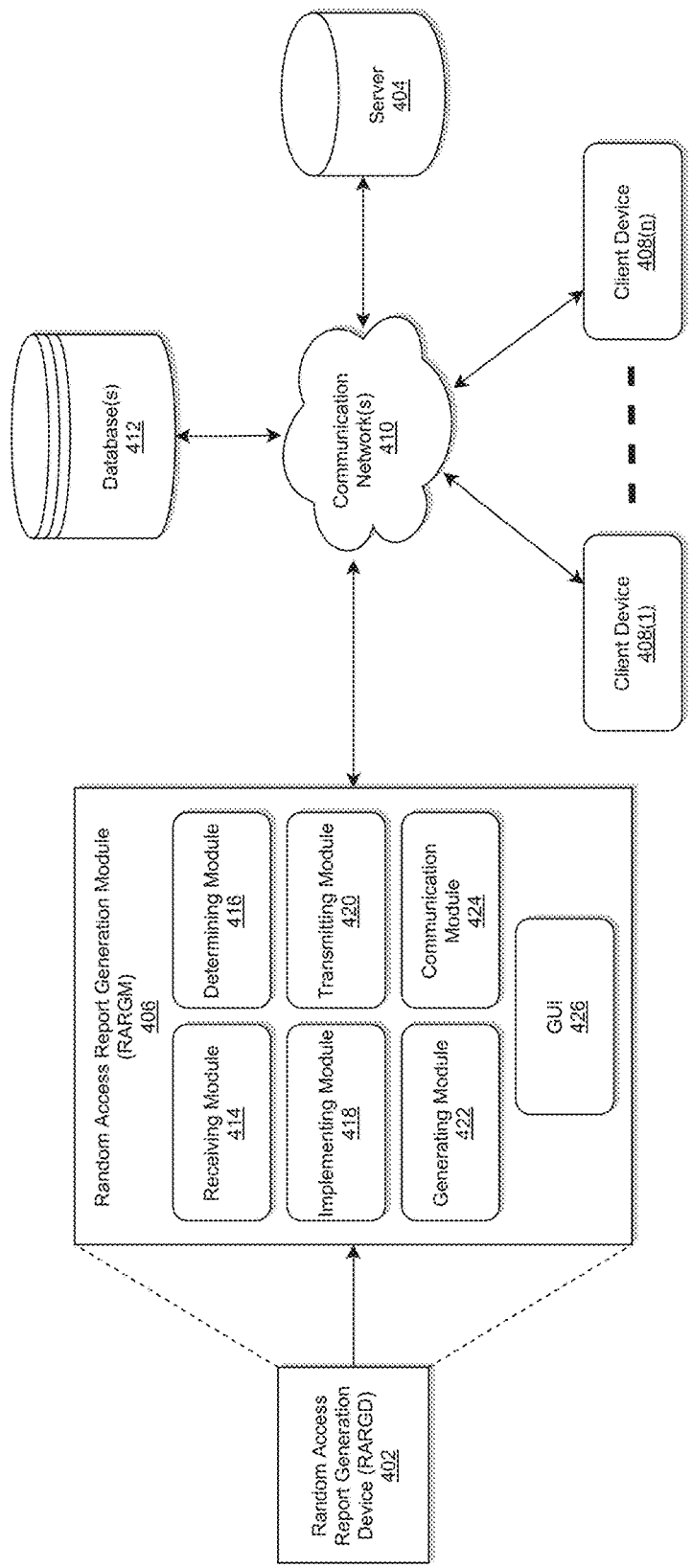
FIG. 4 illustrates a system diagram for implementing a random access report generation module of FIG. 3 in accordance with an exemplary embodiment.

FIG. 4 illustrates a system diagram for implementing a platform and language agnostic random access report generation module (RARGM) of FIG. 3 in accordance with an exemplary embodiment.

According to exemplary embodiments, the system 400 may include a platform and language agnostic random access report generation device (RARGD) 402 within which a RARGM 406 is embedded, a server 404, database(s) 412, and a communication network 410.

According to exemplary embodiments, the RARGD 402 including the RARGM 406 may be connected to the server 404 and the database(s) 412 via the communication network 410. The RARGD 402 may also be connected to the plurality of client devices 408(1)-408(n) via the communication network 410, but the disclosure is not limited thereto. The RARGM 406, the server 404, the plurality of client devices 408(1)-408(n), the database(s) 412, the communication network 410 as illustrated in FIG. 4 may be the same or similar to the RARGM 306, the server 304, the plurality of client devices 308(1)-308(n), the database(s) 312, the communication network 310, respectively, as illustrated in FIG. 3.

According to exemplary embodiments, as illustrated in FIG. 4, the RARGM 406 may include a receiving module 414, a determining module 416, an implementing module 418, a transmitting module 420, a generating module 422, a communication module 424, and a GUI 426.

According to exemplary embodiments, each of the receiving module 414, determining module 416, implementing module 418, transmitting module 420, generating module 422, and the communication module 424 of the RARGM 406 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the receiving module 414, determining module 416, implementing module 418, transmitting module 420, generating module 422, and the communication module 424 of the RARGM 406 may be implemented by microprocessors or similar, and may be programmed using software (e.g., microcode) to perform various functions discussed herein and may optionally be driven by firmware and/or software.

Alternatively, according to exemplary embodiments, each of the receiving module 414, determining module 416, implementing module 418, transmitting module 420, generating module 422, and the communication module 424 of the RARGM 406 may be implemented by dedicated hardware, or as a combination of dedicated hardware to perform some functions and a processor (e.g., one or more programmed microprocessors and associated circuitry) to perform other functions.

According to exemplary embodiments, each of the receiving module 414, determining module 416, implementing module 418, transmitting module 420, generating module 422, and the communication module 424 of the RARGM 406 may be called via corresponding API.

The process may be executed via the communication module 424 and the communication network 410, which may comprise plural networks as described above. For example, in an exemplary embodiment, the various components of the RARGM 406 may communicate with the server 404, and the database(s) 412 via the communication module 424 and the communication network 410. Of course, these embodiments are merely exemplary and are not limiting or exhaustive.

Figure 5:
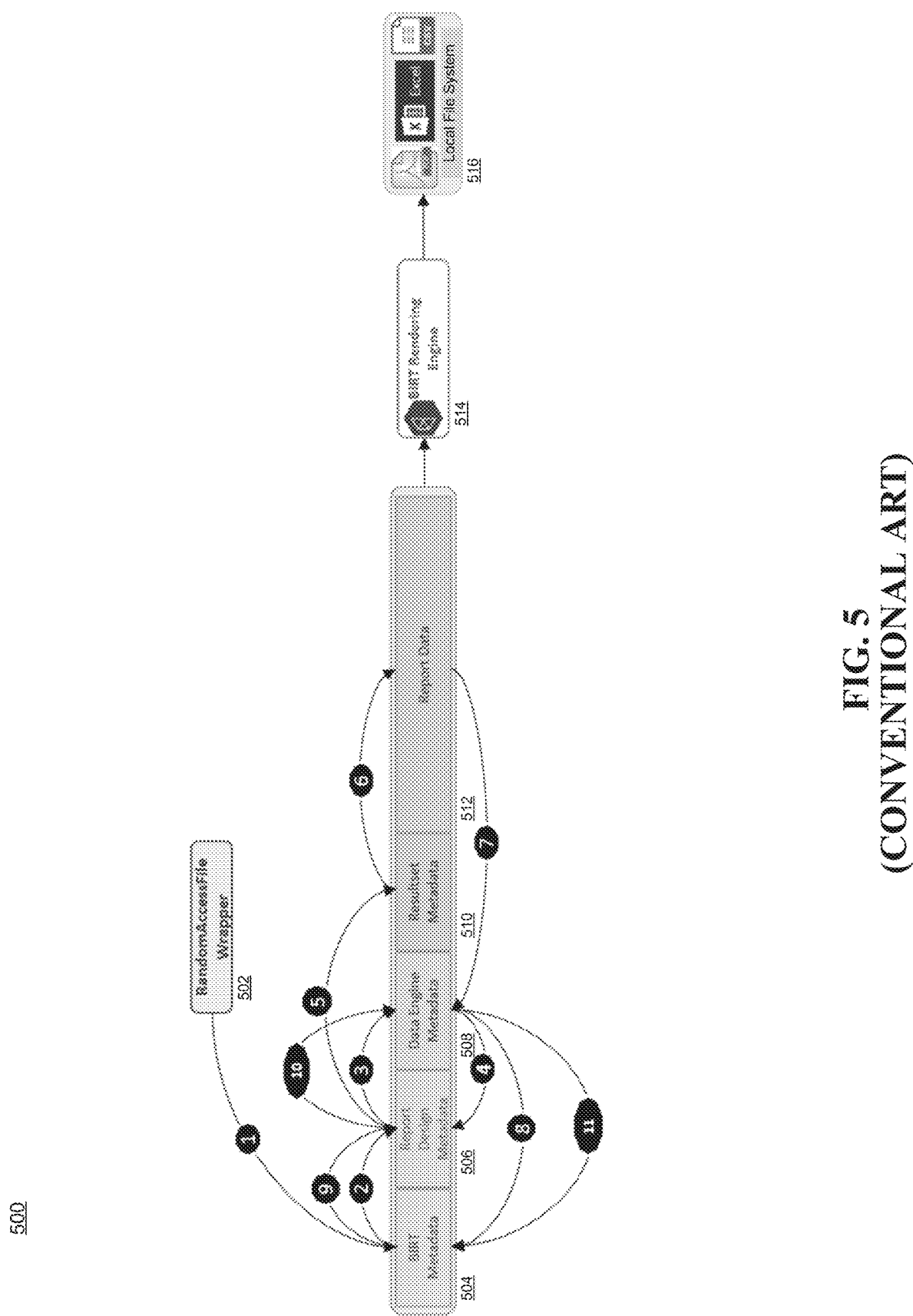
FIG. 5 illustrates a conventional architecture for report generation process.

FIG. 5 illustrates a conventional architecture 500 for a report generation process. This conventional architecture 500 depends heavily on local file writing which is not possible to do in PaaS cloud containers. While deployed in PaaS cloud containers, applications have to make use of storage services like Amazon-S3. Today, there are different types of files that may be read or written by BIRT, i.e., Report Design File; Intermediate File (called as "rptdocument") created for its "Rendering Engine" to render in any format xls, csv, pdf etc.; Temporary Content file—when contents are larger, BIRT may write them to disk (named 'goal file') while rendering; and Final output file (pdf, xls or csv). Out of these different types of files, 'Intermediate' and 'Temporary Content' files may be written in "Random Access" manner where in a structure of file may be initially created and then multiple write operations may be performed by seeking back-and-forth to different sections of file (made possible by native C++ code invoked through java RandomAccessFile class). However, RandomAccessFile class may work well in a non-cloud mode as these files are locally stored. In cloud, one cannot rely on local storage concept. Thus, the conventional report generation architecture 500 lacks the configurations and capabilities for PaaS cloud ready random access report generation.

For example, as illustrated in FIG. 5, the conventional architecture 500 that writes intermediate file (rptdocument) with RandomAccessFile wrapper 502 going back-and-forth (in one cycle). As illustrated in FIG. 5, the labelled arrows point to the sequence in which different sections are written in a 'single' file, and this single file is then handed over to 'BIRT Rendering Engine' 514 for report rendering at a local file system 516. For example, data associated with the RandomAccessFile wrapper 502 flows to a BIRT metadata block 504 first at sequence 1. BIRT metadata may include information regarding BIRT version. At sequence 2, data from the BIRT metadata block 504 flows to a report design metadata block 506. Report design metadata may include information regarding BIRT report design template, master page mapping link, field to display property mapping etc. At sequence 3, data from report design metadata block 506 flows to a data engine metadata block 508. Data engine metadata may include information regarding data engine version, record count in a chunk, metadata about data-query, bookmark etc.

As illustrated in FIG. 5, at sequence 4, data from data engine metadata block 508 flows back to the report design metadata block 506. At sequence 5, data from the report design metadata block 506 flow to a Resultset metadata block 510. Resultset metadata may include information regarding row and fields (within row) start position, column mapping (backend column name to report design column name), and column name and type (e.g. characters, numeric, alpha numeric) mapping etc. At sequence 6, data from the Resultset metadata block 510 flows to a report data block 512. At sequence 7, data from the report data block 512 flows back to the data engine metadata block 508, and at sequence 8, data from the data engine metadata block 508 flows back to the BIRT metadata block 504. At sequence 9, data from the BIRT metadata block 504 flows again to the report design metadata block 506, and then at sequence 10, flows to the data engine metadata block 508. At sequence 11, data from the data engine metadata block 508 flows back to the BIRT metadata block 504.

Thus, the conventional architecture 500 writes intermediate file (rptdocument) with RandomAccessFile wrapper 502 going back-and-forth (in one cycle) executing sequences 1 through 11 as disclosed above. The labelled arrows point to the sequence (i.e., sequences 1 through 11) in which different sections are written in a 'single' file, and this single file is then handed over to the 'BIRT Rendering Engine' 514 for report rendering at the local file system 516.

However, RandomAccessFile class utilized by the conventional architecture 500 may work well in a non-cloud mode as these files are locally stored. In PaaS cloud, one cannot rely on local storage concept. Thus, the conventional report generation architecture 500 lacks the configurations and capabilities for PaaS cloud ready random access report generation.

Figure 6:
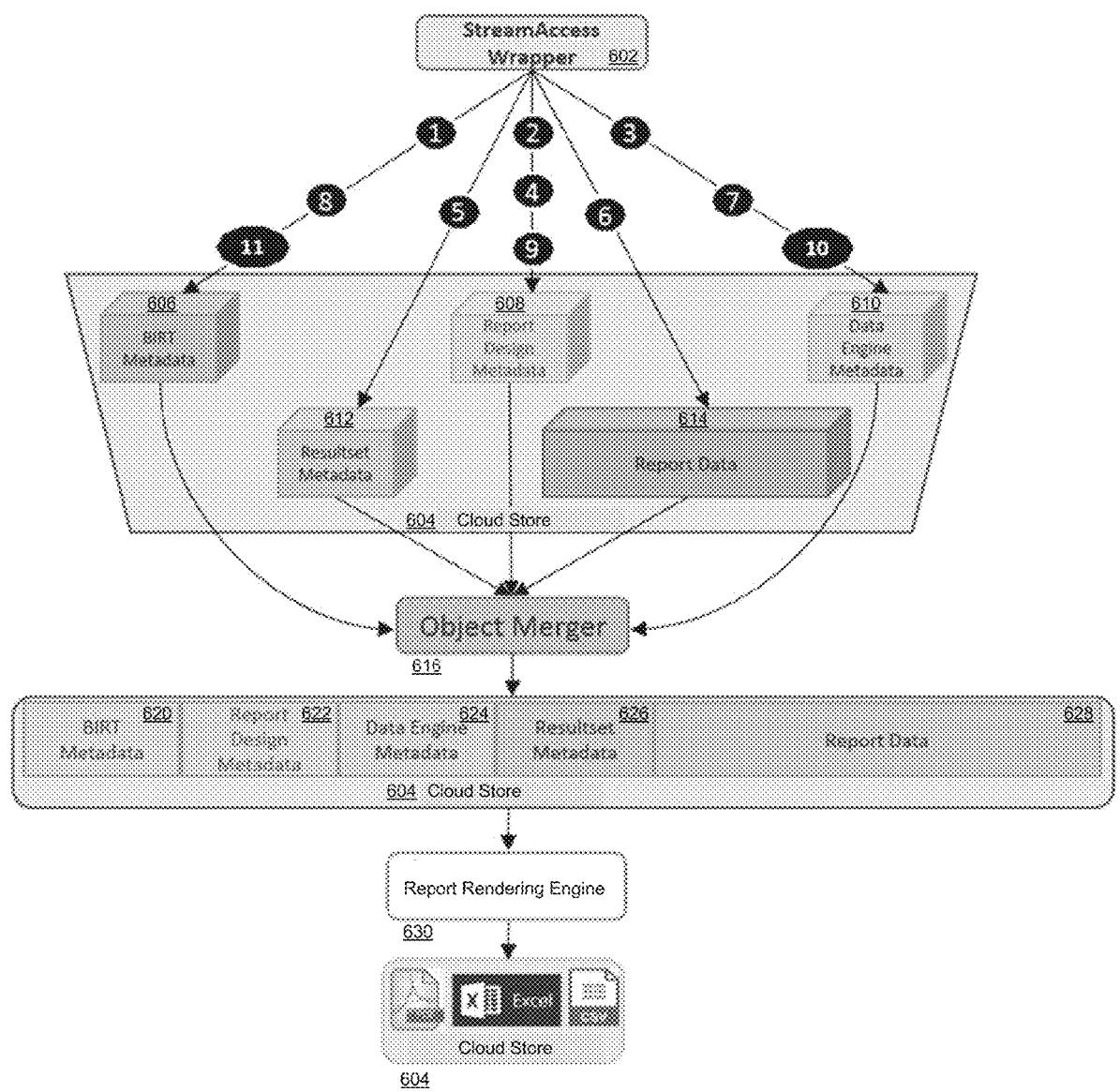
FIG. 6 illustrates an exemplary architecture implemented by the random access report generation module of FIG. 4 in accordance with an exemplary embodiment.

According to exemplary embodiments, FIG. 6 illustrates an exemplary architecture 600 implemented by the RARGM 406 of FIG. 4 that is configured for cloud-ready random access report generation.

Referring back to FIGS. 4 and 6, according to exemplary embodiments, the RARGM 406 may implement two strategies, such as in-memory generation; and stream access writing and generation, but the disclosure is not limited thereto.

In-memory generation may be implemented by the RARGM 406 to emulate "Random Access File' like generation where up to a fixed memory limit, e.g. 100 MB (but the disclosure is not limited thereto), random access writing may be executed in 'in-memory' byte array by shifting positions as it happens in 'Random File Access' over file stream ultimately creating intermediate file (rptdocument).

According to exemplary embodiments, the stream access writing and generation may be implemented by the RARGM 406, for example, for larger intermediate content, multiple sections of intermediate file may be created in separate objects in the object store (i.e., and performed operations on these individual objects with injected readers or writers in existing BIRT framework. Later these objects may be merged to create final intermediate file (rptdocument). The final intermediate file may be in any one of the following formats, but the disclosure is not limited thereto: .xlsx, .xls, .csv, .pdf, etc.

FIG. 6 illustrates how BIRT modified solution writes intermediate file (rptdocument) with stream access wrapper 602 (i.e., StreamAccessWrapper module). As illustrated in FIG. 6, labelled arrows point to the sequence in which different sections are written over multiple objects handled by stream access wrapper 602. These objects are then transmitted to a report rendering engine 630 (i.e., BIRT PaaS rendering engine, but the disclosure is not limited thereto) for report rendering.

As illustrated in FIG. 6, cloud store 604 (i.e., an object store such as Amazon S3 that provides object storage through a web service interface, but the disclosure is not limited thereto) may host a BIRT metadata block 606, a report design metadata block 608, a data engine metadata block 610, a Resultset metadata block 612, and a report data block 614.

Referring to FIGS. 4 and 6, the RARGM 406 may be configured to create a stream access wrapper 602 that is configured for PaaS cloud-ready random access report generation. As illustrated in FIG. 6, the stream access wrapper 602 may be utilized to execute the sequences randomly in the cloud store 604. For example, the RARGM 406 may utilize the stream access wrapper 602 to execute sequences 1, 8, and 11 in the BIRT metadata block 606; execute sequences 2, 4, and 9 in the report design metadata block 608; execute sequences 3, 7, and 10 in the data engine metadata block 610; execute sequences 5 in the Resultset metadata block 612; and execute sequence 6 in the report data block 614.

As illustrated in FIG. 6, an object merger 616 merges all data received from each of the BIRT metadata block 606, report design metadata block 608, data engine metadata block 610, Resultset metadata block 612, and the report data block 614.

According to exemplary embodiments, the stream access wrapper 602 may be a representation of virtual wrapper to orchestrate writing of multiple sections of intermediate file (rptdocument) into multiple objects of the object store, i.e., cloud store 604 as described above. This stream access wrapper 602 component executes creating or identifying the objects location in the object store for writing binary content and splitting it into multiple similar objects if they exceed a threshold.

According to exemplary embodiments, the object merger 616 is a component that keeps track of multiple sections of intermediate file (rptdocument) and their sequences and joins them to create a final intermediate file (rptdocument) based on offset and sequence. The final intermediate file is created based on, for example, from BIRT metadata 620 received from the BIRT metadata block 606, report design metadata 622 received from the report design metadata block 608, data engine metadata 624 received from the data engine metadata block 610, Resultset metadata 626 received from the Resultset metadata block 612, and report data 628 received from the report data block 614.

Figure 7:
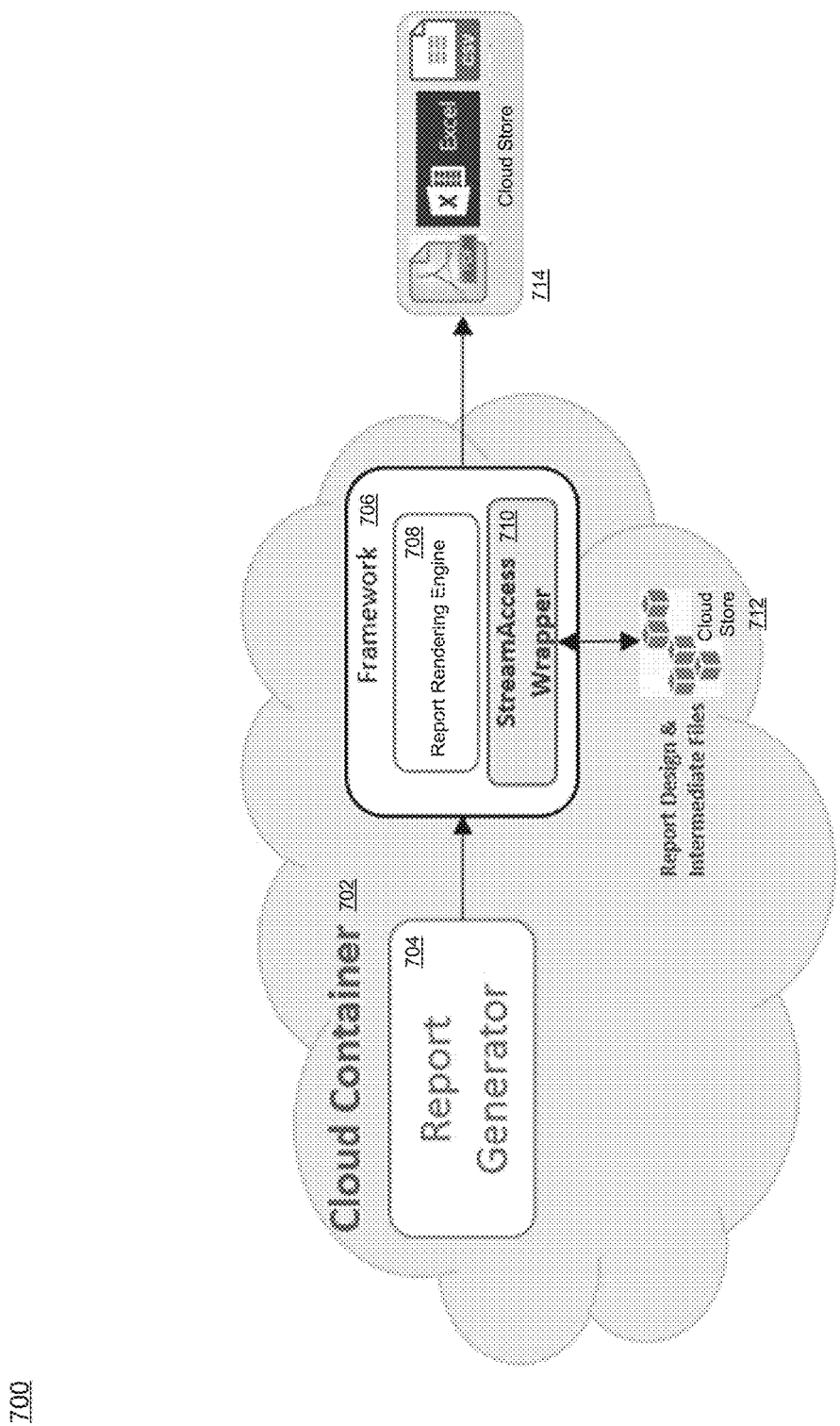
FIG. 7 illustrates an exemplary cloud deployment architecture implemented by the random access report generation module of FIG. 4 in accordance with an exemplary embodiment.

FIG. 7 illustrates an exemplary cloud deployment architecture 700 implemented by the RARGM 406 of FIG. 4 in accordance with an exemplary embodiment. FIG. 7 illustrates a cloud container 702 that may host a report generator 704, a framework 708 (i.e., a BIRT framework, but the disclosure is not limited thereto) that may include a report rendering engine 708 (i.e., a BIRT engine, but the disclosure is not limited thereto), and a stream access wrapper module 710. The stream access wrapper module 710 may communicate with a cloud store 712 for report design and intermediate files. Data from the report generator 704 flows to the framework 706 and the data (i.e., final intermediate file) from the framework 706 flows to an object store (i.e., cloud store 714). FIG. 7 may illustrate a deployment architecture 700 which may be live with client reports in production.

According to exemplary embodiments, a list of all internal section components of 'rptdocument' may include the following, but the disclosure is not limited thereto.

core.rptdocument: Metadata about the report such as which version of BIRT ENGINE is getting used etc.

design.rptdocument: BIRT report design content.

toc.rptdocument: Table Of content which gets printed in case of PDF report.

pages.rptdocument: Mapping between Query Resultset (QuRs) and MasterPage.

design.ir.rptdocument: Detailed mapping between BIRT report design content and fields display properties, e.g. fonts, alignment, rounding type (number) etc.

dataEngineNamingRelation.rptdocument: Entry of bookmark and QuRs files.

dataEngineQueryIdBasedVersioningStream.rptdocument: Entry of QuRs files.

dataEnginequeryStartingID.rptdocument: Query string starting id.

dataEngineVesionInfo.rptdocument: Version of Data Engine is getting used.

datahierarchy.rptdocument: Number of records in each QuRs file.

quRs0DataSetLens.rptdocument: Start position of each row.

quRs0ExprMetaInfo.rptdocument: Mapping between Back end column name and column in BIRT report design content.

quRs0ExprRowLen.rptdocument: Start position of each row field.

quRs0ExprValue.rptdocument: Mapping between BIRT report design column and its value.

quRs0GroupInfo.rptdocument: Start position of each field in row.

quRs0QueryDefn.rptdocument: Mapping between BIRT report design contentcolumn and its value.

quRs0ResultClass.rptdocument: Mapping between BIRT report design content column and corresponding Java Data type class. For example INTEREST_FAMILY_ID-> java.lang. String quRs0DataSetData.rptdocument: Data from database or web service call.

bookmark.rptdocument: Details about bookmark.

contentpage.dat.rptdocument: MasterPage which have details about which landscape to use, Page header and Page footer text etc.

contentpage.idx.rptdocument: MasterPage index string.

reportlet.rptdocument: Details about Reportlet gadget to display in report (if any).

reportletBookmarks.rptdocument: Mapping between Table of content and bookmark.

contentcontent.dat.rptdocument: Report data for small reports. If report has large data, then multiple QuRs files get created.

Referring to FIGS. 4 and 6, according to exemplary embodiments, the receiving module 414 may be configured to receive an initial intermediate file having intermediate contents to be utilized for PaaS cloud ready random access report generation. The determining module 416 may be configured to determine whether the intermediate contents exceed a predetermined memory threshold value. The implementing module 418 may be configured to implement a first mode of report generation algorithm to create a final intermediate file when it is determined that a memory requirement for the intermediate contents is equal to or below the predetermined memory threshold value. Alternatively, the implementing module 418 may be configured to implement a second mode of report generation algorithm to create the final intermediate file when it determined that the memory requirement for the intermediate contents exceed the predetermined memory threshold value. The transmitting module 420 may be configured to transmit the final intermediate file to a rendering engine (i.e., report rendering engine 630 as illustrated in FIG. 6). The generating module 422 may be configured to generate a report based on the final intermediate file and store onto a cloud store 604.

According to exemplary embodiments, in implementing the first mode of report generation algorithm, the determining module 416 may be further configured to determine that the memory requirement for the intermediate contents is equal to or below the predetermined memory threshold value. The RARGM 406 then executes, based on determining, random access writing in a local file system's in-memory byte array by shifting positions as it happens in random file access over file stream and create the final intermediate file.

According to exemplary embodiments, in implementing the second mode of report generation algorithm, the determining module 416 may be further configured to determine that the memory requirement for the intermediate contents exceeds the predetermined memory threshold value. The RARGM 406 then executes, based on determining, random access writing in a PaaS cloud file system (i.e., cloud store 604 as illustrated in FIG. 6 or cloud store 712 as illustrated in FIG. 7).

According to exemplary embodiments, the RARGM 406 may be further configured to: create multiple sections of the initial intermediate file in separate individual objects in the PaaS cloud file system; perform operations on the individual objects with readers or writers in a report generation framework; and merge all individual objects to create the final intermediate file.

According to exemplary embodiments, the RARGM 406 may be further configured to: implement an object merger function that keeps track of the multiple sections of the initial intermediate file and their sequences and joins them to create the final intermediate file based on offset and sequence.

According to exemplary embodiments, the RARGM 406 may be further configured to: implement a stream access wrapper function to execute writing of the multiple sections of the initial intermediate file into the separate individual multiple objects; and identify location of each object in the cloud file system for writing binary content.

According to exemplary embodiments, the RARGM 406 may be further configured to: split the binary content into multiple similar objects when it is determined that memory requirements for the multiple similar objects exceed the predetermined memory threshold value.

Referring back to FIGS. 4, 6, and 7, an exemplary algorithm implemented by the RARGM 406 may include an algorithm, with supplemental data structures, to aid the 'Stream Access Wrapper' 602, 710 and 'Object Merger' 616. The following data structures may be implemented in accordance with exemplary embodiments.

ArrayListOfAnySize (extended ArrayList)

Method 'addAll' of ArrayList does not support adding a collection at an index that is outside the range of ArrayList. Method addAll was extended to support this.

If the index passed is outside the range of ArrayList, the RARGM 406 continues adding byte of −1 till the index point; past which the RARGM 406 adds the actual data. According to exemplary embodiments, the actual data may include a single or multiple chunks of (QuRs) section containing actual data.

DynamicByteArray

DynamicByteArray internally uses the extended ArrayList described above. It acts as a collection of bytes that can grow dynamically up to a configured threshold in a memory. After the threshold is crossed, data is written to the cloud storage by giving it a unique name.

Cloud output stream that uses this data structure maintains a map with these unique names as key and the range of bytes as values. If the output stream wishes to seek a position and write data from that position, the algorithm can take following course of action—

1. If the position is in the range of bytes that is being written in memory as DynamicByteArray, algorithm will update the data in memory itself and once the memory threshold is reached it will write it to the cloud.

2. If the position is in the range that is already written to the cloud, algorithm will use the metadata to find the unique file that contains this position. After finding the file, it will fetch the file from 'Cloud Object Store' and will update.

3. If the position is in the range this is already written to the cloud and the length of data that has to be written, plus the position crosses the range of bytes in the cloud, then algorithm will fetch two parts from the cloud—the actual one and the subsequent part and will update the data.

4. Once all the parts are written, then while closing the OutputStream, the algorithm will merge all the parts to create one single final intermediate file (rptdocument) in 'Cloud Object Store', i.e., cloud store 604 as illustrated in FIG. 6.

According to exemplary embodiments, the following is a pseudo code implemented by the RARGM 406.

```
1. ArrayListOfAnySize -
    a. Extend ArrayList
    b. addAll (int index, Collection c)
        If index is less than size of arraylist
        Return super.addAll(c)
        End if
        Set n to difference between size of arraylist and index
        For counter = 0 to n-1 do
            Call super.add(-1)
        End do
        Call super.addAll(c)
```

```
2. DynamicByteArray -
    Declare an ArrayListOfAnySize variable called listOfBytes (List to maintain data in
memory before it gets promoted to cloud storage after threshold is reached).
    Declare a Map variable called metadata (A map to maintain the part names and their
respective range of bytes that have been moved to cloud storage).
    Declare an integer constant called THRESHOLD (A constant to maintain the threshold
beyond which in-memory data will be promoted to cloud storage)
ArrayListOfAnySize listOfBytes = new ArrayListOfAnySize( );
Map<String, Object> metadata = new HashMap<>( );
add(int position, List bytes) {
    if position in cloudStorage // check in range //available in metadata
        call addToCloudStorage(byte, position);
    else if position is equal -1
        listOfBytes.add(bytes);
    else
        listOfBytes.add(pos, bytes);
    endif
        if listOfBytes.size( ) > THRESHOLD
            call addToCloudStorage(byte, position);
        endif
}
addToCloudStorage(byte[ ] data, position){
    if position not in cloudStorage
        call addPartToCloudStorage( );
        call updateMetaDataWithRangeOfBytes( );
    else if position in cloudstorage
        call fetchPartFromCloudStorage( );
        call updatePartWithLatestByteData(byte);
//check for boundary conditions wherein next part from cloud might be needed to update fully
        call addPartToCloudStorage( );
        call updateMetaDataWithRangeOfBytes( );
    endif
}
mergeParts(String filename){
    getObjectsFromCloudStoragePrefixedWilFileName(fileName);
    getAnOutputStreamFromCloudStorage( )
    Set n to number of Parts fetched.
    For counter = 0 to n-1
    Do
        Call readEachPartIntoTheOutputStream( );
    EndDo
}
```

Figure 8:
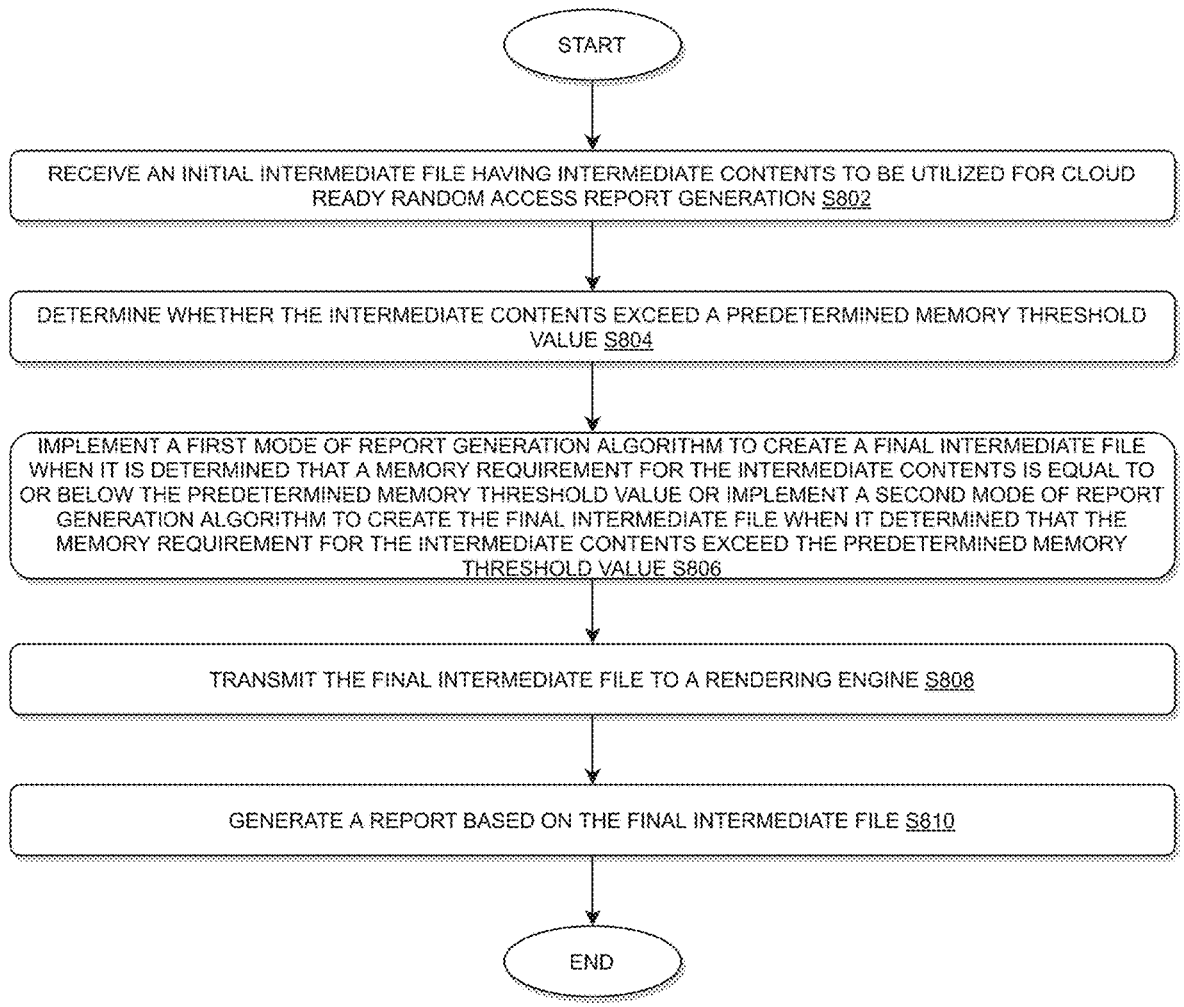
FIG. 8 illustrates an exemplary flow chart implemented by the random access report generation module of FIG. 4 for cloud ready random access report generation in accordance with an exemplary embodiment.

FIG. 8 illustrates an exemplary flow chart 800 implemented by the RARGM 406 of FIG. 4 for cloud ready random access report generation in accordance with an exemplary embodiment. It will be appreciated that the illustrated process 1200 and associated steps may be performed in a different order, with illustrated steps omitted, with additional steps added, or with a combination of reordered, combined, omitted, or additional steps.

As illustrated in FIG. 8, at step S802, the process 800 may include receiving an initial intermediate file having intermediate contents to be utilized for cloud ready random access report generation.

At step S804, the process 800 may include determining whether the intermediate contents exceed a predetermined memory threshold value.

At step S806, the process 800 may include implementing a first mode of report generation algorithm to create a final intermediate file when it is determined that a memory requirement for the intermediate contents is equal to or below the predetermined memory threshold value or implementing a second mode of report generation algorithm to create the final intermediate file when it determined that the memory requirement for the intermediate contents exceed the predetermined memory threshold value.

At step S808, the process 800 may include transmitting the final intermediate file to a rendering engine.

At step S810, the process 800 may include generating a report based on the final intermediate file.

According to exemplary embodiments, in implementing the first mode of report generation algorithm, the process 800 may further include: determining that the memory requirement for the intermediate contents is equal to or below the predetermined memory threshold value; executing, based on determining, random access writing in a local file system's in-memory byte array by shifting positions as it happens in random file access over file stream; and creating the final intermediate file.

According to exemplary embodiments, in implementing the second mode of report generation algorithm, the process 800 may further include: determining that the memory requirement for the intermediate contents exceeds the predetermined memory threshold value; and executing, based on determining, random access writing in a PaaS cloud object storage.

According to exemplary embodiments, the process 800 may further include: creating multiple sections of the initial intermediate file in separate individual objects in the cloud file system; performing operations on the individual objects with readers or writers in a report generation framework; and merging all individual objects to create the final intermediate file.

According to exemplary embodiments, the process 800 may further include: implementing an object merger function that keeps track of the multiple sections of the initial intermediate file and their sequences and joins them to create the final intermediate file based on offset and sequence.

According to exemplary embodiments, the process 800 may further include: implementing a stream access wrapper function to execute writing of the multiple sections of the initial intermediate file into the separate individual multiple objects; and identifying location of each object in the cloud file system for writing binary content.

According to exemplary embodiments, the process 800 may further include: splitting the binary content into multiple similar objects when it is determined that memory requirements for the multiple similar objects exceed the predetermined memory threshold value.

According to exemplary embodiments, the RARGD 402 may include a memory (e.g., a memory 106 as illustrated in FIG. 1) which may be a non-transitory computer readable medium that may be configured to store instructions for implementing a RARGM 406 for cloud ready random access report generation as disclosed herein. The RARGD 402 may also include a medium reader (e.g., a medium reader 112 as illustrated in FIG. 1) which may be configured to read any one or more sets of instructions, e.g., software, from any of the memories described herein. The instructions, when executed by a processor embedded within the RARGM 406 or within the RARGD 402, may be used to perform one or more of the methods and processes as described herein. In a particular embodiment, the instructions may reside completely, or at least partially, within the memory 106, the medium reader 112, and/or the processor 104 (see FIG. 1) during execution by the RARGD 402.

According to exemplary embodiments, the instructions, when executed, may cause a processor embedded within the RARGM 406 or the RARGD 402 to perform the following: receiving an initial intermediate file having intermediate contents to be utilized for cloud ready random access report generation; determining whether the intermediate contents exceed a predetermined memory threshold value; implementing a first mode of report generation algorithm to create a final intermediate file when it is determined that a memory requirement for the intermediate contents is equal to or below the predetermined memory threshold value or implementing a second mode of report generation algorithm to create the final intermediate file when it determined that the memory requirement for the intermediate contents exceed the predetermined memory threshold value; transmitting the final intermediate file to a rendering engine; and generating a report based on the final intermediate file. According to exemplary embodiments, the processor may be the same or similar to the processor 104 as illustrated in FIG. 1 or the processor embedded within RARGD 202, RARGD 302, RARGD 402, and RARGM 406.

According to exemplary embodiments, in implementing the first mode of report generation algorithm, the instructions, when executed, may further cause the processor 104 to perform the following: determining that the memory requirement for the intermediate contents is equal to or below the predetermined memory threshold value; executing, based on determining, random access writing in a local file system's in-memory byte array by shifting positions as it happens in random file access over file stream; and creating the final intermediate file.

According to exemplary embodiments, in implementing the second mode of report generation algorithm, the instructions, when executed, may further cause the processor 104 to perform the following: determining that the memory requirement for the intermediate contents exceeds the predetermined memory threshold value; and executing, based on determining, random access writing in a PaaS cloud object storage.

According to exemplary embodiments, the instructions, when executed, may further cause the processor 104 to perform the following: creating multiple sections of the initial intermediate file in separate individual objects in the cloud file system; performing operations on the individual objects with readers or writers in a report generation framework; and merging all individual objects to create the final intermediate file.

According to exemplary embodiments, the instructions, when executed, may further cause the processor 104 to perform the following: implementing an object merger function that keeps track of the multiple sections of the initial intermediate file and their sequences and joins them to create the final intermediate file based on offset and sequence.

According to exemplary embodiments, the instructions, when executed, may further cause the processor 104 to perform the following: implementing a stream access wrapper function to execute writing of the multiple sections of the initial intermediate file into the separate individual multiple objects; and identifying location of each object in the cloud file system for writing binary content.

According to exemplary embodiments, the instructions, when executed, may further cause the processor 104 to perform the following: splitting the binary content into multiple similar objects when it is determined that memory requirements for the multiple similar objects exceed the predetermined memory threshold value.

According to exemplary embodiments as disclosed above in FIGS. 1-4 and 6-8, technical improvements effected by the instant disclosure may include a platform for a random access report generation module that is configured for cloud ready random access report generation so that streams of data can be accessed in random fashion and can be deployed in PaaS containers, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for cloud ready random access report generation by utilizing one or more processors along with allocated memory, the method comprising:

receiving, by the one or more processors, an initial intermediate file having intermediate contents to be utilized for cloud ready random access report generation;

creating, by the one or more processors, multiple sections of the initial intermediate file;

writing the multiple sections of the initial intermediate file into separate individual multiple objects in a cloud file system;

maintaining, by the one or more processors, track of the multiple sections of the initial intermediate file and sequences of the multiple sections;

determining, by the one or more processors, whether the intermediate contents exceed a predetermined memory threshold value;

in response to the determining:
when a memory requirement for the intermediate contents is equal to or below the predetermined memory threshold value, executing random access writing in a local file system's in-memory byte array by shifting positions in random file access over a file stream to store the intermedia contents in the local file system; and creating, by implementing a first mode of report generation algorithm, a final intermediate file in a readable file format for a rendering engine, wherein the creating the final intermediate file includes joining the multiple sections of the initial intermediate file based on offset and the sequences of the multiple sections; and when the memory requirement for the intermediate contents exceeds the predetermined memory threshold value, executing random access writing in a cloud object storage via a web service interface to store the intermediate contents in the cloud object storage; and creating, by implementing a second mode of report generation algorithm, the final intermediate file, wherein the creating the final intermediate file includes performing operations on the separate individual multiple objects with readers or writers in a report generation framework and merging the separate individual multiple objects, wherein the second mode is different from the first mode;

transmitting, by the one or more processors via network, the final intermediate file to the rendering engine; and generating, by the rendering engine based on the final intermediate file, a random access report including metadata and contents.

2. The method according to claim 1, further comprising: implementing a stream access wrapper function to execute; identifying location of each object in the cloud file system for writing binary content.

3. The method according to claim 2, further comprising: splitting the binary content into multiple similar objects when memory requirements for the multiple similar objects exceed the predetermined memory threshold value.

4. A system for cloud ready random access report generation, the system comprising:

a processor; and a memory operatively connected to the processor via a communication interface, the memory storing computer readable instructions that, when executed, causes the processor to:

receive an initial intermediate file having intermediate contents to be utilized for cloud ready random access report generation;

create multiple sections of the initial intermediate file;

write the multiple sections of the initial intermediate file into separate individual multiple objects in a cloud file system;

maintain track of the multiple sections of the initial intermediate file and sequences of the multiple sections;

determine whether the intermediate contents exceed a predetermined memory threshold value;

in response to the determining:
when a memory requirement for the intermediate contents is equal to or below the predetermined memory threshold value, execute random access writing in a local file system's in-memory byte array by shifting positions in random file access over a file stream to store the intermedia contents in the local file system; and create, by implementing a first mode of report generation algorithm, a final intermediate file in a readable file format for a rendering engine, wherein the creating the final intermediate file includes joining the multiple sections of the initial intermediate file based on offset and the sequences of the multiple sections; and when the memory requirement for the intermediate contents exceeds the predetermined memory threshold value, execute random access writing in a cloud object storage via a web service interface to store the intermediate contents in the cloud object storage; and create, by implementing a second mode of report generation algorithm, the final intermediate file, wherein the creating the final intermediate file includes performing operations on the separate individual multiple objects with readers or writers in a report generation framework and joining the separate individual multiple objects, wherein the second mode is different from the first mode;

transmit the final intermediate file to the rendering engine; and generate, by the rendering engine based on the final intermediate file, a random access report including metadata and contents.

5. The system according to claim 4, wherein the processor is further configured to: implement a stream access wrapper function to identify location of each object in the cloud file system for writing binary content.

6. The system according to claim 5, wherein the processor is further configured to: split the binary content into multiple similar objects when memory requirements for the multiple similar objects exceed the predetermined memory threshold value.

7. A non-transitory computer readable medium for cloud ready random access report generation, the non-transitory computer readable medium configured to store instructions that, when executed, causes a processor to perform following:

receiving an initial intermediate file having intermediate contents to be utilized for cloud ready random access report generation;

creating multiple sections of the initial intermediate file;
writing the multiple sections of the initial intermediate file into separate individual multiple objects in a cloud file system;
maintaining track of the multiple sections of the initial intermediate file and sequences of the multiple sections;
determining whether the intermediate contents exceed a predetermined memory threshold value;
in response to the determining:
   when a memory requirement for the intermediate contents is equal to or below the predetermined memory threshold value, executing random access writing in a local file system's in-memory byte array by shifting positions in random file access over a file stream to store the intermedia contents in the local file system; and creating, by implementing a first mode of report generation algorithm, a final intermediate file in a readable file format for a rendering engine, wherein the creating the final intermediate file includes joining the multiple sections of the initial intermediate file based offset and the sequences of the multiple sections; and
   when the memory requirement for the intermediate contents exceeds the predetermined memory threshold value, executing random access writing in a cloud object storage via a web service interface to store the intermediate contents in the cloud object storage; and create, by implementing a second mode of report generation algorithm, the final intermediate file, wherein the creating the final intermediate file includes performing operations on the separate individual multiple objects with readers or writers in a report generation framework; and joining the separate individual multiple objects, wherein the second mode is different from the first mode;
transmitting the final intermediate file to the rendering engine; and
generating, by the rendering engine based on the final intermediate file, a random access report including metadata and contents.

8. The non-transitory computer readable medium according to claim 7, wherein the instructions that, when executed, cause the processor to further perform the following: implementing a stream access wrapper function to execute identifying location of each object in the cloud file system for writing binary content.

9. The non-transitory computer readable medium according to claim 8 wherein the instructions that, when executed, cause the processor to further perform the following: splitting the binary content into multiple similar objects when memory requirements for the multiple similar objects exceed the predetermined memory threshold value.

\* \* \* \* \*